(12) United States Patent
Lai et al.

(10) Patent No.: US 8,760,403 B2
(45) Date of Patent: Jun. 24, 2014

(54) HYBRID HUMAN-INTERFACE DEVICE

(71) Applicant: PixArt Imaging Inc., Hsin-Chu (TW)

(72) Inventors: Hung Ching Lai, Hsin-Chu (TW); Cho Yi Lin, Hsin-Chu (TW); Chia Hsin Yu, Hsin-Chu (TW); Yen Min Chang, Hsin-Chu (TW); Chih Yen Wu, Hsin-Chu (TW); Feng Cheng Yang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 13/928,067

(22) Filed: Jun. 26, 2013

(65) Prior Publication Data

US 2013/0285907 A1 Oct. 31, 2013

Related U.S. Application Data (63) Continuation-in-part of application No. 12/770,875, filed on Apr. 30, 2010, and a continuation-in-part of application No. 13/290,122, filed on Nov. 6, 2011, and a continuation-in-part of application No. 13/554,052, filed on Jul. 20, 2012, and a continuation-in-part of application No. 13/614,861, filed on Sep. 13, 2012, now abandoned.

(51) Int. Cl.
*G06F 3/033* (2013.01)

(52) U.S. Cl.
USPC ........... 345/163; 345/156; 345/166; 345/173; 178/18.09; 178/18.11

(58) Field of Classification Search
USPC .................. 345/156–178; 178/18.01–18.11
See application file for complete search history.

(56) References Cited

U.S. PATENT DOCUMENTS

| 4,589,140 A | 5/1986 | Bishop et al. |
|---|---|---|
| 4,782,328 A | 11/1988 | Denlinger |
| 5,484,966 A | 1/1996 | Segen |
| 6,337,919 B1 * | 1/2002 | Dunton ........................ 382/124 |
| 7,552,402 B2 | 6/2009 | Bilow |
| 7,609,250 B2 * | 10/2009 | Choi ............................. 345/163 |
| 7,969,410 B2 | 6/2011 | Kakarala |
| 8,004,660 B2 | 8/2011 | Brown |
| 8,581,847 B2 * | 11/2013 | Chang et al. .................. 345/163 |
| 2004/0046741 A1 | 3/2004 | Low et al. |
| 2004/0239653 A1 | 12/2004 | Stuerzlinger |
| 2007/0152966 A1 | 7/2007 | Krah et al. |
| 2008/0150913 A1 | 6/2008 | Bell et al. |
| 2008/0259053 A1 | 10/2008 | Newton |
| 2009/0058807 A1 | 3/2009 | Kang et al. |
| 2009/0090569 A1 | 4/2009 | Lin |
| 2009/0109178 A1 | 4/2009 | Kim et al. |

(Continued)

*Primary Examiner* — Dmitriy Bolotin
(74) *Attorney, Agent, or Firm* — Lowe Hauptman & Ham, LLP (57) ABSTRACT

The present invention discloses a hybrid human-interface device including an optical navigation module and a pointing module. The optical navigation module is configured to replace the conventional buttons of a convention pointing device, such as an optical mouse or a trackball mouse or TV controller. The optical navigation module is configured to sense gestures of at least one object operated by a user to activate commands associated with particular programs running on the host. Since the optical navigation module is only configured to sense gestures of the object but not the movement of the hybrid human-interface device relative to a surface, the resolution thereof is aimed to be sufficiently high enough for sensing gestures and no need to be relatively high.

20 Claims, 6 Drawing Sheets

(56) References Cited

U.S. PATENT DOCUMENTS

| | | |
|---|---|---|
| 2010/0026723 A1 | 2/2010 | Nishihara et al. |
| 2010/0079413 A1 | 4/2010 | Kawashima et al. |
| 2010/0265178 A1 | 10/2010 | Benko et al. |
| 2011/0029185 A1 | 2/2011 | Aoki et al. |
| 2012/0113062 A1 * | 5/2012 | Briden et al. ............ 345/175 |

* cited by examiner

HYBRID HUMAN-INTERFACE DEVICE

CROSS REFERENCE TO RELATED APPLICATION

This application is a continuation-in-part application of U.S. Ser. No. 12/770,875, filed on Apr. 30, 2010, and a continuation-in-part application of U.S. Ser. No. 13/290,122, filed on Nov. 06, 2011, and a continuation-in-part application of U.S. Ser. No. 13/554,052, filed on Jul. 20, 2012, and a continuation-in-part application of U.S. Ser. No. 13/614,861, filed on Sep. 13, 2012, the full disclosure of which are incorporated herein by reference.

BACKGROUND

1. Field of the Invention

This invention generally relates to a hybrid human-interface device and, more particularly, to a hybrid human-interface device including an optical navigation module configured to sense a gesture of at least one finger and a module configured to navigate pointer or cursor of a host device.

2. Description of the Related Art

For a conventional pointing device, e.g. an optical mouse and a trackball mouse, a pointer shown on a display of a host is controlled by a relative displacement between the pointing device and a surface. The pointing device generally includes two buttons (left and right buttons) for activating commands associated with the movement of the pointer on the display. Usually, when a user wants to execute a program, drag an icon, modify a picture, etc., the user moves the pointer on the display and points the pointer on a particular graphic user interface (GUI) then presses at least one button to activate commands. To enhance the applications of conventional pointing devices, some pointing devices are provided with more than two buttons; therefore, the user may define particular functions activated by pressing the additional buttons or by pressing several buttons simultaneously associated with moving the pointer on the display.

However, too many buttons integrated on a pointing device may confuse the user since the user can only operate the buttons with at most five fingers one time. For example, when the user tries to press as many buttons as he or she can, the user may hardly move the pointing device to move the pointer on the display.

There is another kind of pointing device which applies an optical sensor module in replace of the conventional mouse. The optical sensor module is configured to emit light to the finger and receive the reflected light from the finger for sensing a movement of the finger thereby controlling the pointer on the display. This kind of pointing device is compact and the sensing area is relatively small, which is disadvantaged in low resolution, hard to precisely control the pointer, hard to move the pointer fast, etc.

Besides, the aforementioned conventional mouse is difficult in controlling the pointer to move very straight toward a direction, to move along a particular path, to draw a fair arc or to have an accurate fine movement due to the unstable operation of human hands and fingers.

Recently, a kind of pointing device having a capacitive touch module (CTM) or a resistive touch module (RTM) is provided. The CTM or RTM is applied to sense the touching motion of fingers for activating commands. More particularly, the CTM or RTM includes a sensor array uniformly distributed over a sensing area. When the fingers properly touch on the sensing area, the touching motion will cause an electrical variation of the sensor array that indicates the touched position on the sensor array. However, to ensure correct detection of fingers, the whole CTM or RTM has to maintain in function-well condition. Once a portion of the CTM or RTM is failed, the movement of fingers cannot be detected correctly. Furthermore, fingers have to substantially touch the CTM or RTM strong enough to be sensed by the pointing device. All of these properties limit the application of the technologies.

Thus, it is important to provide a pointing device that may activate commands in various ways without using buttons and move precisely for better control.

SUMMARY

The present invention provides a hybrid human-interface device including an optical navigation module and a pointing module. The pointing module is configured to sense a movement of the hybrid human-interface device relative to a surface for navigate a pointer or a cursor on a host device, such as a computer or a TV. The optical navigation module is configured to replace the conventional buttons (such as left button, right button, or rolling wheel) of a conventional pointing device, such as an optical mouse or a trackball mouse. The optical navigation module is configured to sense gestures of at least one finger of a user to activate commands associated with particular programs running on a host. Since the optical navigation module is only configured to sense gestures of the finger but not the movement of the hybrid human-interface device relative to the surface, the resolution of the optical navigation module is aimed to be sufficiently high enough for sensing gestures and no need to relatively high.

The present invention further provides a hybrid human-interface device including an optical navigation module and a pointing module. The optical navigation module is configured to assist in moving the pointer more close to the user's demands. By sensing a particular gesture of at least one finger, the optical navigation module may be configured to activate a command for limiting the moving direction of the pointer so as to move the pointer in a straight line on the display, or to roll the window up-down, or to roll the window left-right. Therefore, the user may operate the pointer very precisely along a desired direction better than a conventional pointing device. Besides, by sensing a particular gesture of at least one finger, the optical navigation module may be configured to directly move the pointer, to move the pointer at a relatively higher speed on the display, or to directly move the pointer in a limited range or to move the window in different speeds with the assistance of at least one key on a keyboard.

Since the optical navigation module may be operated in many ways, such as sliding at least one finger, posing a gesture, multi-touching of fingers, clicking of at least one finger, rotating at least one finger, etc., the optical navigation module provides a more instinctive way of operating the pointer or the window on the display rather than conventional pointing devices in which a user may only choose press or not to press buttons thereon to activate commands.

The optical navigation module of the present invention includes at least one image sensor, at least one light source, and at least one scattering layer. The light source emits light and at least one object operated by a user reflects the emitted light to be received by the image sensor. Since different motions of gestures of the object cause different images on the image sensor, the optical navigation module then transforms the images into electric signals for controlling the pointer shown on a display or for activating particular programs running on a host. The scattering layer is configured to scatter the light emitted from the light source or the light reflected from the object. Without the scattering layer, the reflected light may have too strong intensity before the object really touches the second module and causes misoperation.

The hybrid human-interface device of the present invention is for being operated by a user on a surface. The hybrid human-interface device includes a first module, a second module and a processor. The first module is configured to sense a movement of the hybrid human-interface device relative to the surface. The second module includes a light source, an image sensor, and a scattering layer. The light source is configured to emit light. The image sensor is configured to capture an image containing at least one light spot of at least one object operated by the user from reflecting the light emitted by the light source. The scattering layer is configured to scatter the light emitted from the light source or the light reflected from the object. The processor is configured to identify gestures according to a position information of the light spot on the image and generate a positional signal of the object.

The present invention is able to be integrated with the conventional structure of optical mouse or trackball mouse by adding the optical navigation module of the present invention and changing related periphery devices. In an aspect of the present invention, the first module and the second module included in the hybrid human-interface device may share the same light source.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

In the descriptions that follow, the present invention will be described in reference to the embodiments that describe a hybrid human-interface device with optical navigation module for replacing the conventional pointing device with buttons. However, embodiments of the present invention are not limited to any particular environment, application or implement. Therefore, the descriptions of the embodiments that follow are for purpose of illustration and not limitation. It is understood that elements indirectly related to the present invention are omitted and are not shown in the following embodiments and drawings.

The following figures show several examples of the present invention, which are similar to conventional mouse. That is, the hybrid human-interface devices of the present invention shown below are intended to include a pointing module that is able to navigate pointer or cursor of a host device, such as a computer or a TV, etc. In other embodiment, the pointing module may be replaced by other equipment, such as a trackball pointing module or a mechanical navigation module. People skilled in the art know well the functions of conventional pointing modules, and redundant explanation is omitted hereinafter.

Figure 1:
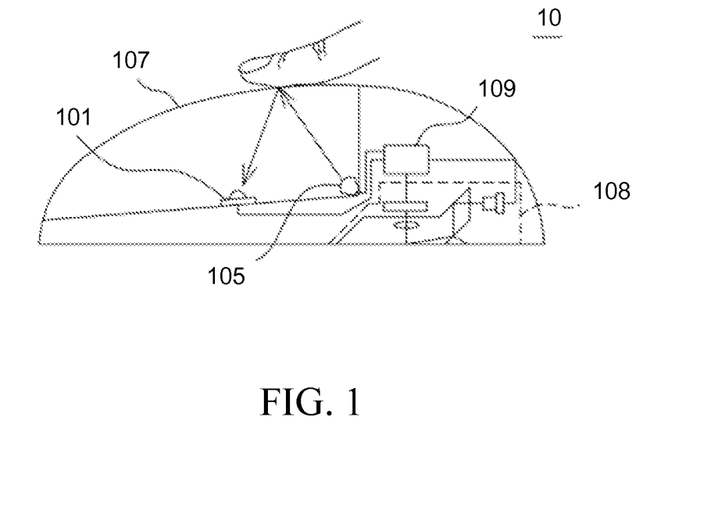
FIG. 1 shows a schematic diagram of the hybrid human-interface device according to the first embodiment of the present invention.

FIG. 1 shows a schematic diagram of the hybrid human-interface device 10, which comprises the first embodiment of the present invention. The hybrid human-interface device 10 includes an image sensor 101, a light source 105 and a processor 109 electrically connected to the image sensor 101, the light source 105 and a pointing module 108. In this embodiment, the pointing module 108 is like a conventional optical mouse module. For other embodiments, the pointing module may be a conventional TV remote controller module or a conventional optical trackball module.

Figure 5:
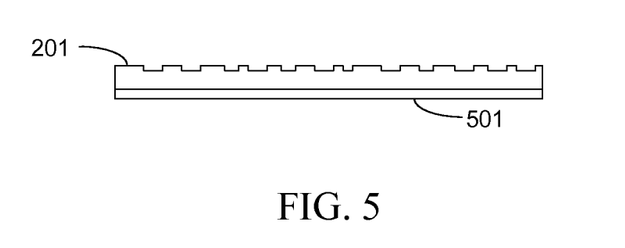
FIG. 5 shows a filter integrated with a scattering layer of the present invention.

It is noted that the number of the light source and the image sensor is not the limitation of the present invention. The hybrid human-interface device 10 further includes an operation field 107, which is an upper surface of a touch plate, for a user to place at least one finger and move the finger thereon. The light source 105 emits light and the finger of the user reflects the emitted light as shown in FIG. 5. The reflected light may be received by the image sensor 101 and derive an image signal. Generally, strength of the image signal is proportional to the intensity of the reflected light received by the image sensor 101. The processor 109 is configured to identify a relative distance between the finger and the light source 105 according to the variation of the light spot of the image and to generate a positional signal of the finger. Thus the positional signal is adapted to control the pointer or the cursor. For example, a sequence of positional signals may be interpreted as a gesture to trigger a command of the host. Further, the positional signal is adapted and associated with the pointing module to trigger a command. For example, the pointing module may select an icon or launch a program, and then the positional signal can trigger a command to execute the icon or program.

The light emitted from the light source 105 will be scattered by a scattering layer before it reaches the user's finger. Or the light reflected from the finger will be scattered by the scattering layer before it reaches the image sensor 101. Thus the reflected light from the finger to the image sensor 101 would have lower intensity. Otherwise, the finger may cause too much strong reflected light before the finger really touch the operation field 107, it is also called hovering status. Under hovering status, the processor 109 may wrongly determine that the finger is already put on the operation field 107. The present invention is configured to reduce the misoperation caused by hovering status. The scattering layer can scatter the light from the light source 105 and thus reduce the light intensity of reflected light from the finger. When the finger does not reach the operation field 107 but the distance between the finger and the operation field 107 is sufficient short to make the reflected light, the scattering layer is configured to reduce the strength of the image signal below a threshold value, thus the processor 109 would not react to the hovering status until the finger touches the operation field 107. Preferably, the Signal-Noise-Ratio (SNR) of the image signal and noise is applied for determining the threshold value. The processor 109 determines that the finger touches the operation field 107 when the SNR is greater than a predetermined value, such as SNR=2. Thus, under hovering status, the scattering layer is configured to reduce the SNR at sufficient low value.

To achieve the aforementioned threshold value, the scattering layer may be formed by coating an optical scattering material (e.g., a metal material or some other material having a high reflection coefficient) on at least one surface. Furthermore, the scattering layer may also be formed by etching at least one surface to form a plurality of recesses on the bottom surface. Or the scattering layer may be formed by forming some protuberance on at least one surface. Or the scattering layer may be made with some particles inside. The aforementioned means are adapted to reduce the amount of light from the light source 105 before it reaches the finger. Preferably, an area of the coating and the aforementioned recesses, protuberance or particle may have a diameter with the range from 10 μm to 100 μm.

For present mice design, the scattering layer can be placed in several positions correspondingly. For example, the operation field 107 can be the top surface of the scattering layer, and the operation field 107 can also be made with the aforementioned scattering characters, such as etching, coating, recesses, and protuberance. On the other hand, the scattering layer can be a different layer from the operation field 107 and be placed below the operation field 107. For certain design, a mouse can have more than one scattering layer against hovering status since the more the scattering layer are, the light can be scattered more uniformly.

Figure 2A:
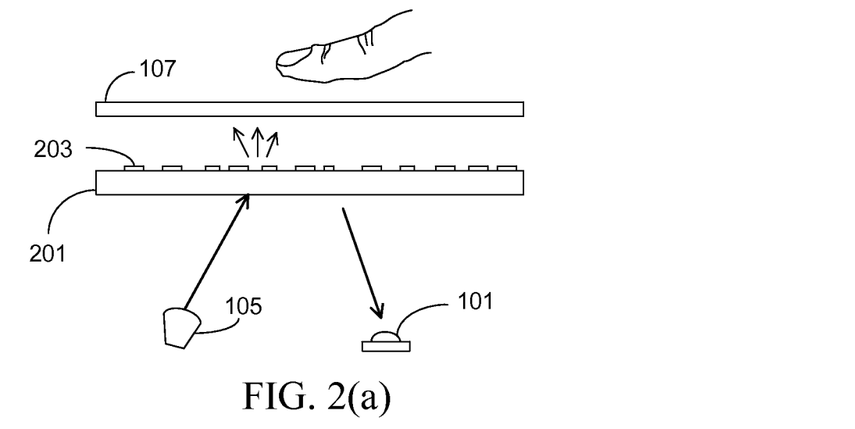
FIGS. 2(a)-2(c) show several embodiments of the scattering layer with protuberance.
Figure 2B:
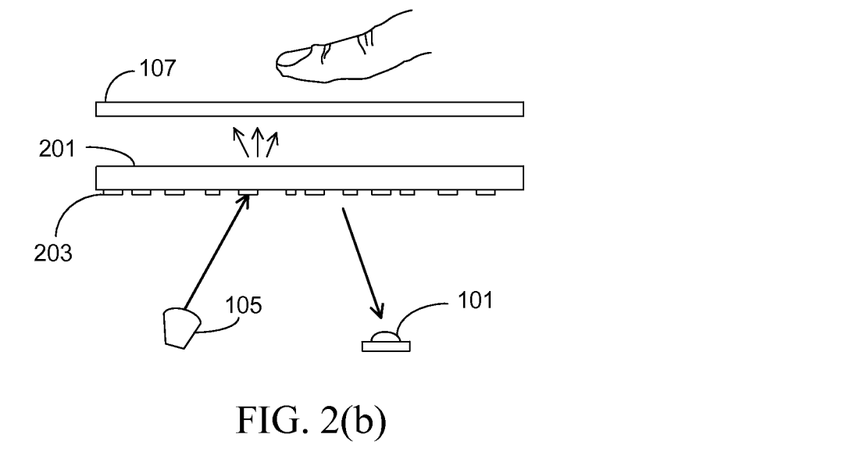
Figure 2C:
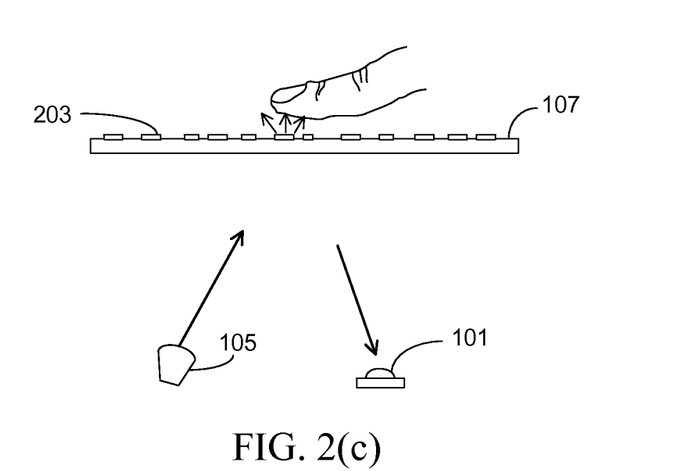

FIGS. 2(a)-2(c) show several embodiments of the scattering layer with protuberance. These figures are exemplarily to show the relative position of the scattering layer and the operation field. FIG. 2(a) shows a scattering layer 201 with many protuberances 203 on one surface. The protuberances 203 are formed on the top surface of scattering layer 201, and the light emitted from the light source 105 would be scattered by the protuberances 203 before it reaches the finger. Similarly, FIG. 2(b) shows a scattering layer 201 with many protuberances 203. The difference between FIGS. 2(a) and 2(b) is, the protuberances 203 in FIG. 2(b) are formed on the bottom surface of the scattering layer 201.

FIG. 2(c) shows an operation field 107 having many protuberances 203 formed on one surface, and the light emitted from the light source 105 would be scattered by the protuberances 203 before it reaches the finger. In this embodiment, it can be realized that the operation field 107 is made of scattering character, i.e. the operation field 107 is one side of the scattering layer for placing finger.

For the aforementioned embodiments, the scattering layer can be more than one layer to achieve particular scattering design and reduce hovering status.

Figure 3A:
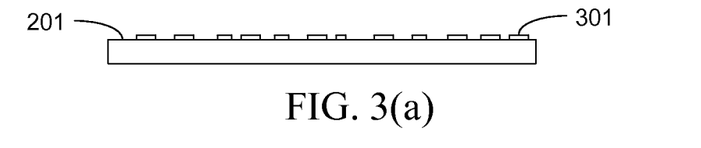
FIGS. 3(a)-3(e) show several embodiments of the scattering layer of the present invention.
Figure 3B:
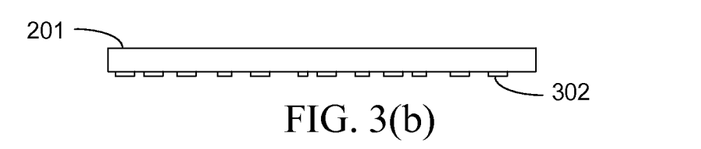
Figure 3C:
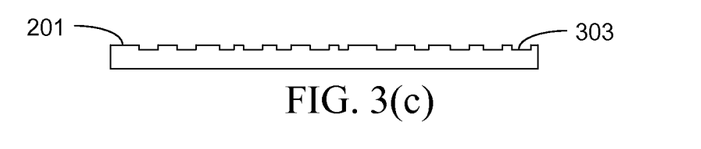
Figure 3D:
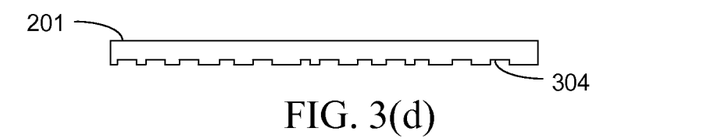
Figure 3E:
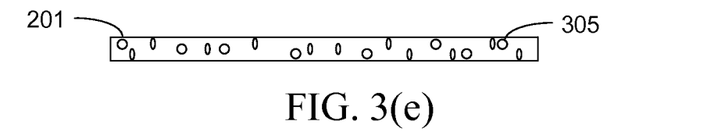

FIGS. 3(a)-3(e) shows several embodiments of the scattering layer. These figures are exemplarily to show variety of scattering layer design. FIG. 3(a) shows a scatter layer 201 having protuberances 301 on the top surface, the protubrances 301 can be formed by, exemplarily, printing/adhering scattering material or growing scattering material on the surface. Exemplarily, the scattering material can be A-state, B-stage, or C-stage resin. FIG. 3(b) is similar to FIG. 3(a), and the difference between FIG. 3(b) and FIG. 3(a) is that FIG. 3(b) shows the protuberances 302 on the bottom surface. FIG. 3(c) shows a scatter layer 201 having recesses 303 on the top surface, the recesses 303 can be formed by, exemplarily, etching the top surface of the scattering layer 201 or molding the scattering layer 201. FIG. 3(d) is similar to FIG. 3(c), and the difference between FIG. 3(d) and FIG. 3(c) is that FIG. 3(d) shows the recesses 304 on the bottom surface. FIG. 3(e) shows a scattering layer 201 having particles 305 inside to scatter light.

Figure 4:
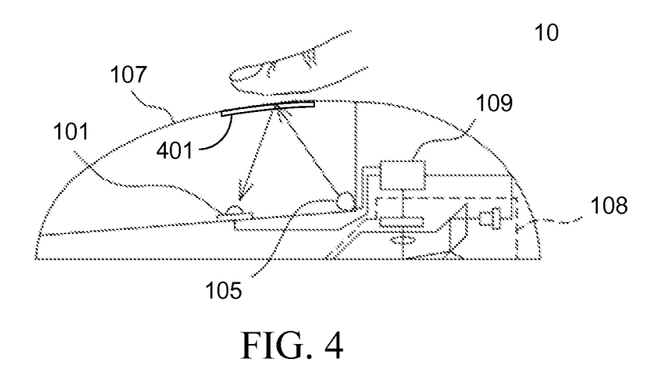
FIG. 4 shows another embodiment of the present invention.

The hybrid human-interface device 10 may comprises a filter to filter out undesired light, thus the image sensor 101 can properly receive the light originally from the light source 105. FIG. 4 shows another embodiment of the present invention, wherein a filter 401 is placed between the image sensor 101 and the operation field 107. For example, when the light source 105 emits infrared light, the filter 401 is configured to filter out visible light, thus the image sensor 101 can duly receive the infrared light from the light source 105 after it is reflected by the finger. When the light source 105 is configured to emit light with particular wavelength, the filter 401 can be chosen correspondingly to filter out light with other wavelengths.

In other embodiment, to filter undesired light, the image sensor can be manufactured with filter, such as placing a filter at least partially covering the image sensor or at least partially coating a filtering layer on the image sensor. Otherwise, the filter can be integrated with the scattering layer. FIG. 5 exemplarily shows a filter 501 integrated with the scattering layer 201.

Figure 6:
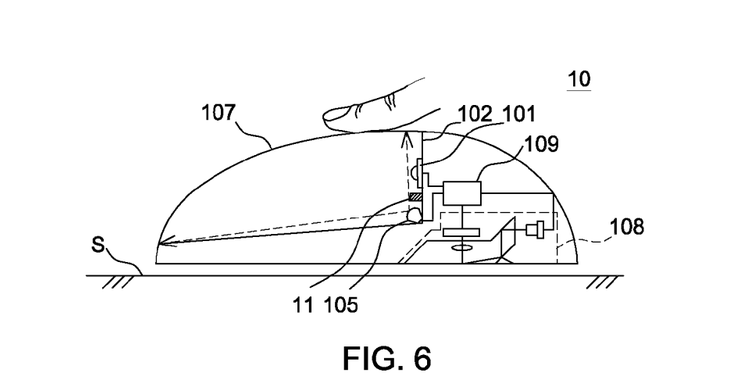
FIGS. 6-7 show schematic diagrams of the hybrid human-interface device according to another embodiment of the present invention.
Figure 7:
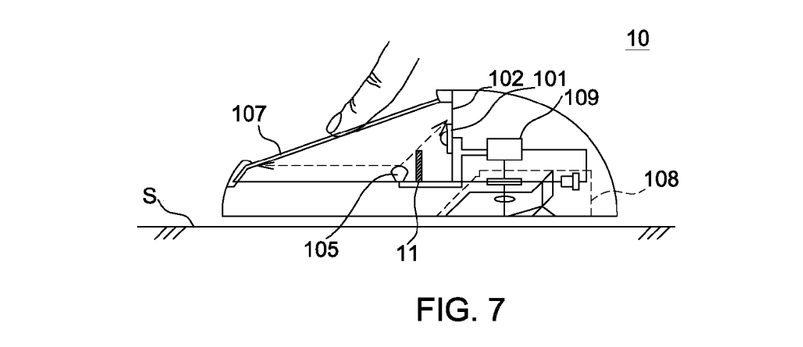

In another embodiment, the image sensor 101 may be disposed on a vertical wall 102 inside the hybrid human-interface device 10 as shown in FIGS. 6 and 7 such that the image sensor 101 may only capture the finger(s) on the operation field 107 without detecting the palm of the hand when the hybrid human-interface device 10 is grabbed by the user's hand. More specifically, the vertical wall 102 may have one end directly connecting to (or extending from) one end of the operation field 107 instead of being disposed opposite to the operation field 107 such that an included angle is formed between the vertical wall 102 and the operation field 107, e.g. between 70-110 degrees. In another embodiment, one end of the vertical wall 102 may be connected to (or extended from) the upper shell of the hybrid human-interface device 10 extending from the operation field 107 (i.e. the operation field 107 is a part of the upper shell) with an included angle therebetween, e.g. between 70-110 degrees. In another embodiment, the vertical wall 102 may not be directly connected to the upper shell and the operation shield 107 as long as the image sensor 101 can be arranged to face the front end of the hybrid human-interface device 10. In this manner, the image sensor 101 is arranged to face a direction that the finger(s) moves forward or backward on the operation field 107, e.g. performing scrolling operation. More specifically speaking, in this embodiment a field of view of the image sensor 101 is directed substantially in a horizontal direction rather than directed upward; i.e. parallel to a work surface S for operating the hybrid human-interface device 10 or a bottom surface of the hybrid human-interface device 10 which is put on the work surface S in operation. That is, the field of view of the image sensor 101 contains the plane parallel to the bottom surface of the hybrid human-interface device 10. It is appreciated that the light source 105 is not limited to be disposed at the position shown in FIGS. 6 and 7, and the light source 105 may be disposed at any suitable position as long as it is able to illuminate the operation field 107.

In this embodiment, the vertical wall 102 may be made of suitable material, e.g. plastic or rubber. The vertical wall 102 may be an extended part of another component of the hybrid human-interface device 10 or an independent member fastened to another component of the hybrid human-interface device 10 through at least one securing member without any limitation as long as it can be fixed inside the hybrid human-interface device 10.

The operation field 107 may be formed as an arc shape as shown in FIG. 6 or a tilted plane surface as shown in FIG. 7 without any limitation, and the operation field 107 may only be formed on the top front portion of the hybrid human-interface device 10 and is transparent to the light emitted by the light source 105. In one embodiment, as the top rear portion of the hybrid human-interface device 10 is for the user to put his or her palm thereon, the top rear portion is preferably opaque to the light emitted by the light source 105. It is appreciated that the operation field 107 is not limited to be just a half of the upper shell of the hybrid human-interface device 10, and the operation field 107 may be more than or less than a half of the upper shell of the hybrid human-interface device 10.

In this manner, the image sensor 101 may capture an image containing at least one light spot formed by at least one object (e.g. the finger) operated on the operation field 107 reflecting the light emitted by the light source 105 directly to the image sensor 101. The processor 109 may position the at least one object according to the at least one light spot in the captured image.

In one aspect, in order to prevent the light emitted by the light source 105 from being directly received by the image sensor 101 to degrade the image quality, the hybrid human-interface device 10 may further include a light blocking member 11 disposed inside the shell of the hybrid human-interface device 10 between the light source 105 and the image sensor 101 so as to block the light emitted from the light source 105. It is appreciated that the size and the position of the light blocking member 11 do not have particular limitation as long as it is able to prevent the light emitted by the light source 105 from being directly received by the image sensor 101. In another embodiment, the emission range of the light source 150 may be defined by a secondary optics lens in front of the light source 150 such that the light blocking member 11 is no longer necessary.

The aforementioned light source may be any conventional light source, such as LED, LD, IR, etc., and is not a limitation of the present invention. The advantage of applying IR as the light source is to use the invisible character thereof to prevent from affecting the user's sense of sight. The tracking data retrieved from the movement of the touched fingers are also available in assisting moving the pointer shown on the display. For example, when the optical navigation module senses the touched finger moving in a direction identical to the direction that the pointing module moves, e.g. the touched finger moves toward left as well as the pointing module moves the pointer toward left, the pointer may be accelerated in moving faster toward left. Or the optical navigation module can temporarily control the movement of the pointer, with or without the assistance of at least one key on a keyboard, by moving at least one finger on the operation field after the optical navigation module senses a particular gesture. The operation field and/or the image sensor of the aforementioned embodiments may be placed with a tilted angle for placing the fingers conveniently and easier sensing the image.

As mentioned above, conventional pointing devices with optical sensor module have problems of hard to precisely control the pointer and hard to move the pointer in a relatively higher speed. And the conventional pointing devices with CTM or RTM have to be operated with relatively larger pressing force and have to be maintained in function-well condition. Therefore, the present invention provides a hybrid human-interface device that has multi-touch functions so as to be operated in a more instinctive way. Furthermore, since the optical navigation module of the present invention is configured to sense the gesture or movement of a user's finger, the resolution of the image sensor of all aforementioned embodiments may be not as high as the sensor of the pointing module.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A hybrid human-interface device, for being operated by a user on a work surface and result in relative movement between the hybrid human-interface device and the work surface, the hybrid human-interface device comprising:
   a first module configured to sense a movement of the hybrid human-interface device relative to the work surface;
   a vertical wall inside the hybrid human-interface device;
   a second module, comprising:
      a light source configured to emit light; and
      an image sensor disposed on the vertical wall and having a field of view parallel to a bottom surface of the hybrid human-interface device, and configured to capture an image containing at least one light spot formed by at least one object operated by the user reflecting the light emitted by the light source directly to the image sensor;
   a scattering layer configured to scatter the light emitted from the light source and/or the light reflected from the object;
   a processor configured to identify a relative distance between the object and the light source according to the variation of the light spot of the image and to generate a positional signal of the object;
   wherein the scattering layer is configured to reduce the intensity of the reflected light from the finger to the image sensor.

2. The hybrid human-interface device as claimed in claim 1, wherein the first module is an optical navigation module or a mechanical navigation module.

3. The hybrid human-interface device as claimed in claim 1, wherein the second module further comprises an operation field for placing the object, and the scattering layer is placed between the operation field and the light source.

4. The hybrid human-interface device as claimed in claim 1, wherein the scattering layer is made by coating an optical scattering material on at least one surface thereof.

5. The hybrid human-interface device as claimed in claim 1, wherein the scattering layer is made by etching at least one surface thereof to form a plurality of recesses.

6. The hybrid human-interface device as claimed in claim 1, wherein the scattering layer is made by forming a plurality of protuberances on at least one surface thereof.

7. The hybrid human-interface device as claimed in claim 1, wherein the scattering layer is made with a plurality of particles inside.

8. The hybrid human-interface device as claimed in claim 4, wherein an area of the coating has a diameter from 10 µm to 100 µm.

9. The hybrid human-interface device as claimed in claim 1, wherein the light source is configured to emit the light with a particular wavelength, and the second module further comprises a filter to filter out light with wavelengths other than the particular wavelength.

10. The hybrid human-interface device as claimed in claim 1, wherein the first module comprises an image sensor, and the resolution of the image sensor of second module is lower than the resolution of the image sensor of first module.

11. The hybrid human-interface device as claimed in claim 5, wherein the recesses have a diameter from 10 µm to 100 µm.

12. The hybrid human-interface device as claimed in claim 6, wherein the protuberances have a diameter from 10 μm to 100 μm.

13. The hybrid human-interface device as claimed in claim 7, wherein the particles have a diameter from 10 μm to 100 μm.

14. The hybrid human-interface device as claimed in claim 1, further comprising a light blocking member between the light source and the image sensor.

15. The hybrid human-interface device as claimed in claim 3, wherein an included angle between the vertical wall and the operation field is between 70-110 degrees.

16. A hybrid human-interface device, for being operated by a user on a work surface and result in relative movement between the hybrid human-interface device and the work surface, the hybrid human-interface device comprising:
- a first module configured to navigate a pointer or a cursor on a host device;
- a vertical wall inside the hybrid human-interface device;
- a second module, comprising:
  - a light source configured to emit light; and
  - an image sensor disposed on the vertical wall and having a field of view parallel to a bottom surface of the hybrid human-interface device, and configured to capture an image containing at least one light spot formed by at least one object operated by the user reflecting the light emitted by the light source directly to the image sensor;
- a scattering layer configured to scatter the light emitted from the light source and/or the light reflected from the object;
- a processor configured to identify a relative distance between the object and the light source according to the variation of the light spot of the image and to generate a positional signal of the object, and the positional signal is adapted and associated with the first module to trigger a command;

wherein the scattering layer is configured to reduce the intensity of the reflected light from the finger to the image sensor.

17. The hybrid human-interface device as claimed in claim 16, further comprising a light blocking member between the light source and the image sensor.

18. The hybrid human-interface device as claimed in claim 16, wherein the second module further comprises an operation field for placing the object and having an included angle with respect to the vertical wall between 70-110 degrees.

19. A hybrid human-interface device, for being operated by a user on a work surface and result in relative movement between the hybrid human-interface device and the work surface, the hybrid human-interface device comprising:
- a first module configured to sense a movement of the hybrid human-interface device relative to the work surface;
- a vertical wall inside the hybrid human-interface device;
- a second module, comprising:
  - an operation field located only on a top front portion of the hybrid human-interface device and having an included angle with respect to the vertical wall between 70-110 degrees;
  - a light source configured to emit light toward the operation field;
  - an image sensor disposed on the vertical wall and having a field of view covering the operation field, and configured to capture an image containing at least one light spot formed by at least one object operated on the operation field reflecting the light emitted by the light source directly to the image sensor; and
- a processor configured to position the at least one object according to the at least one light spot in the image.

20. The hybrid human-interface device as claimed in claim 19, further comprising a light blocking member between the light source and the image sensor.

* * * * *